United States Patent [19]

Rose et al.

[11] Patent Number: 4,469,021

[45] Date of Patent: Sep. 4, 1984

[54] DUAL FEED STENCIL ASSEMBLY FOR A SANDWICHING MACHINE

[75] Inventors: Edward Rose, Skokie; David E. Weber, Chicago, both of Ill.

[73] Assignee: Peters Machinery Company, Chicago, Ill.

[21] Appl. No.: 450,527

[22] Filed: Dec. 17, 1982

[51] Int. Cl.³ .......................... A21C 9/04; B29F 3/01; B29F 3/04
[52] U.S. Cl. ................................ 99/450.4; 99/450.7; 118/25; 118/301; 118/313; 425/376 B
[58] Field of Search .......................... 99/450.1–450.8; 425/381, 310, 382 R, 376 B; 118/25, 301, 313; 137/625.11, 625.16; 251/207, 208, 304, 345; 222/485, 486, 553, 554

[56] References Cited

U.S. PATENT DOCUMENTS 3,340,824 9/1967 Talbot .............................. 425/382 R
4,162,882 7/1979 Rose .................................. 99/450.7

Primary Examiner—Timothy F. Simone

Attorney, Agent, or Firm—Allegretti, Newitt, Witcoff & McAndrews, Ltd.

[57] ABSTRACT

A sandwiching machine for applying creme, for example, a chocolate or vanilla flavored filling, jelly, peanut butter or the like, to at least two laterally spaced rows of cookies traveling along said sandwiching machine. The sandwiching machine includes improved stencil means for applying creme to the cookies in a uniform manner comprising a stencil sleeve and a stencil rotatable thereon, the stencil having spaced apart discharge orifices and the stencil sleeve having inlets at each side of the discharge orifices, valve means within the stencil sleeve for controlling the flow of creme through the discharge orifices, and creme hopper means communicating with the stencil sleeve inlets. The creme hopper means in one embodiment includes a single hopper for supplying the same creme to each stencil sleeve inlet. Alternatively, the creme hopper means may comprise a compartmented hopper or separate hoppers for supplying either the same or different cremes to the stencil sleeve inlets for uniform discharge from the stencil orifices.

11 Claims, 8 Drawing Figures

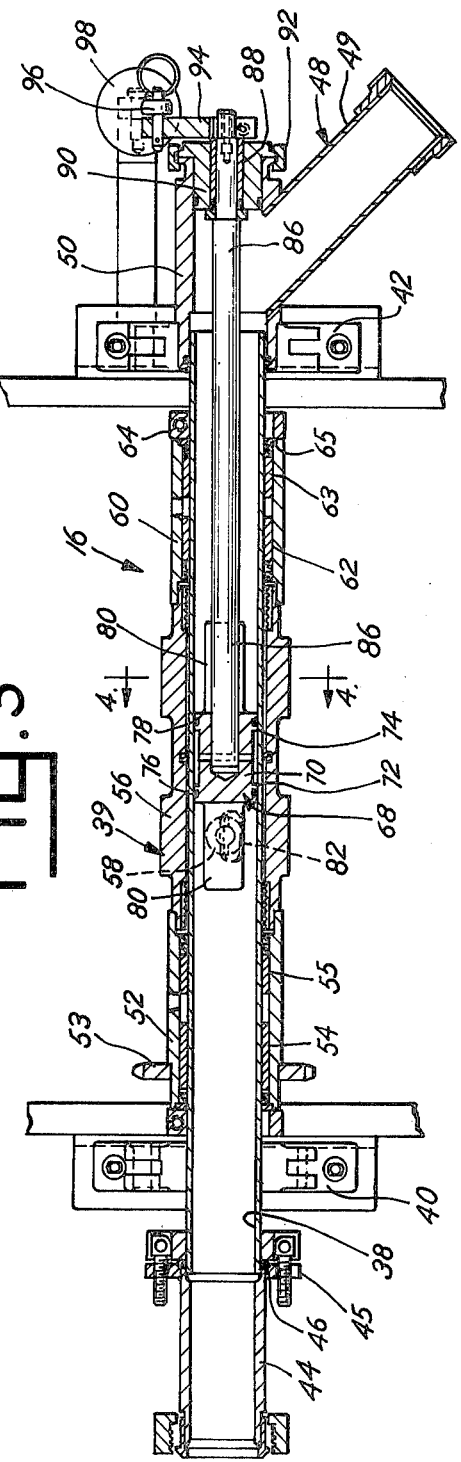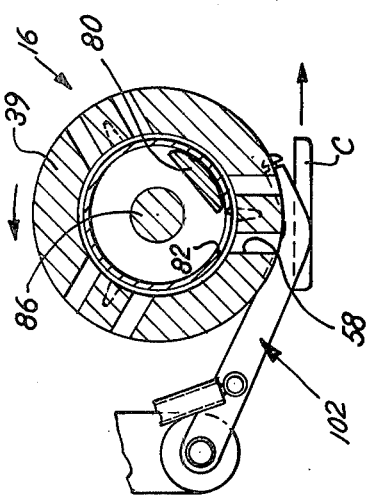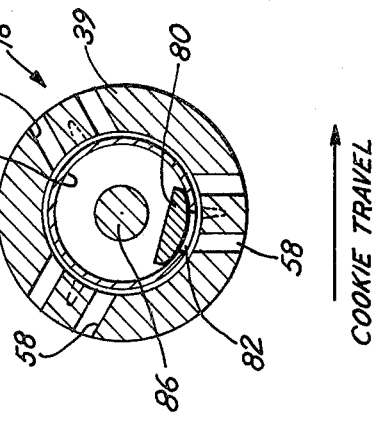

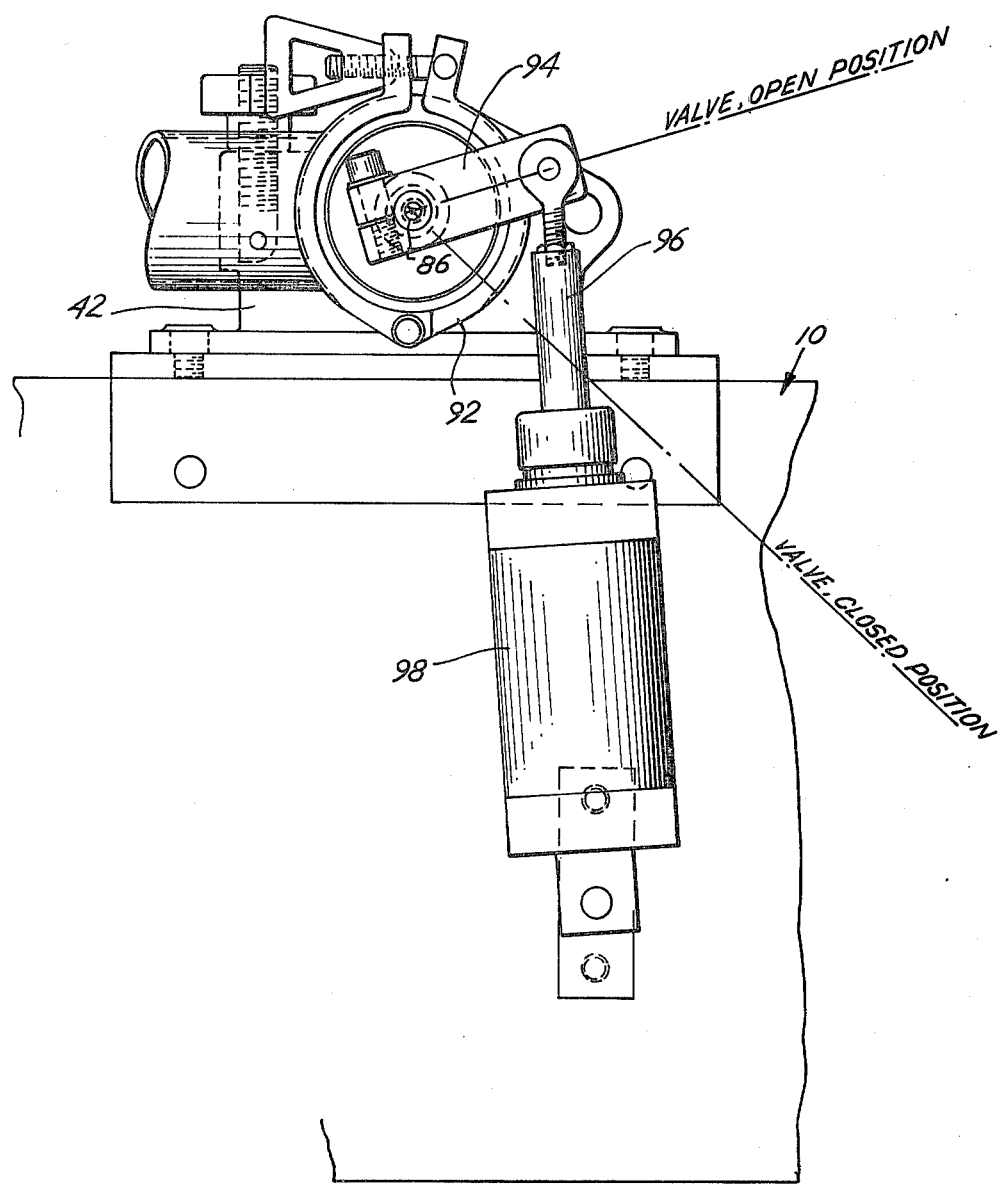

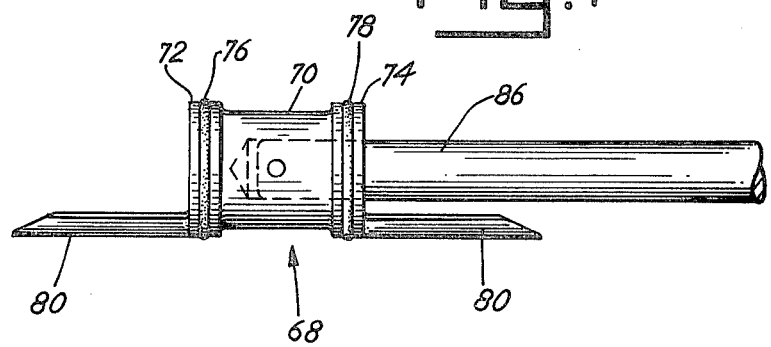
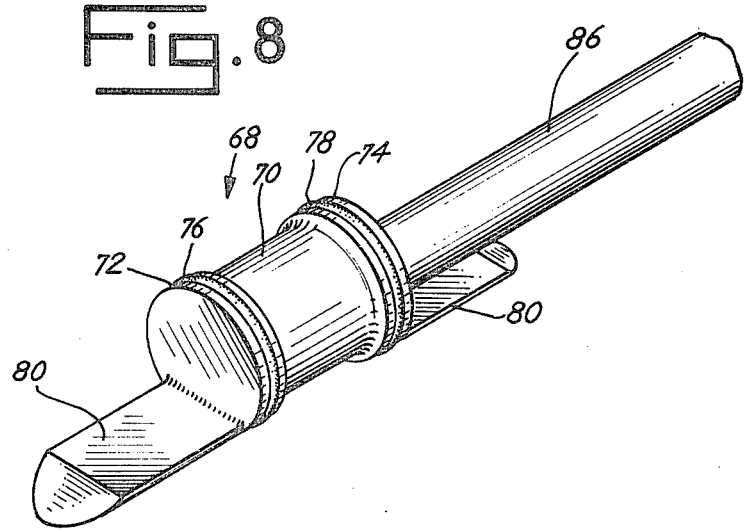

DUAL FEED STENCIL ASSEMBLY FOR A SANDWICHING MACHINE

BACKGROUND OF THE INVENTION

This invention relates to an improved manner of feeding creme uniformly to rows of cookies traveling in side-by-side relationship in a sandwiching machine and more particularly, to a dual feed stencil tube for a sandwiching machine.

An example of the type of sandwiching machine to which the present invention may be applied is shown in Fay U.S. Pat. No. 2,993,453. In the Fay sandwiching machine, two rows of cookies are carried in side-by-side relationship along taut wires by conveyors traveling at the same rates of speed. The cookes pass beneath stencil means which apply creme simultaneously to two cookies and then beneath a hopper for depositing another cookie on top of the creme on the cookie in each row, thus forming two sandwiches, with creme between the two cookies in each sandwich.

In the Fay sandwiching machine illustrated in U.S. Pat. No. 2,993,453, the stencil means are comprised of a stencil sleeve or hollow shaft having a stencil or depositor drum with openings or orifices rotatable on the stencil sleeve. Creme is fed to one end of the stencil sleeve for discharge from the separate spaced openings or orifices. During use, the discharge from the orifices is sometimes not uniform. The orifice furthest from the inlet end of the stencil sleeve discharges less creme than the orifice closer to the inlet end of the stencil sleeve.

Subsequently, it was proposed that proportioning valve means be used to evenly distribute creme from at least a pair of orifices in the depositor drum. Two arrangements of proportioning valve means are shown in Talbot U.S. Pat. No. 3,340,824 and Rose U.S. Pat. No. 4,162,882. Such proportioning valve means provided a more uniform equalization of creme feed and discharge from the orifices than the Fay sandwiching machine.

However, there was a desire for not only more uniformity of feed of creme from at least two spaced apart discharge orifices, but also a sandwiching machine of enhanced capabilities. There has been provided by the present invention a unique stencil means or stencil assembly, which is fed from both sides of the discharge orifices, so as to provide for uniform discharge of creme from at least a pair of discharge orifices. The concept of feeding from both ends of a stencil means provides for other advantages not heretofore provided in sandwiching machines. The stencil means may be fed one creme at each end from an single hopper or the hopper can be divided or separate hoppers provided to feed a different creme to each side of the stencil means. For example, the inventive sandwiching machine can precisely and uniformly feed chocolate filling to one row of cookies and vanilla filling to the adjacent row of cookies in a two-row sandwiching machine.

An object of the present invention is to provide a stencil means fed from both ends for discharging creme uniformly onto rows of cookies traveling in side-by-side relationship in a sandwiching machine.

Another object of the present invention is to provide a sandwiching machine with improved stencil means having inlets at each end for receiving creme from one or two sources and uniformly discharging said creme from the stencil means.

Other objects and advantages will be made more apparent hereinafter.

DESCRIPTION OF THE DRAWINGS

There is shown in the drawings a presently preferred embodiment of the present invention, wherein like numerals refer to like elements in the various views and wherein:

FIG. 3 is a transverse cross-sectional view of the stencil assembly adapted to be fed creme from each end and showing the valve therein for controlling the discharge of creme from the discharge orifices in the stencil of the stencil assembly;

FIG. 4 is a cross-sectional view taken along line 4—4 of FIG. 3, showing the valve in its fully closed position;

FIG. 5 is a cross-section view similar to FIG. 4, showing the valve in its open position and showing a portion of the cut off assembly for assuring the creme is released from the rotating stencil of the stencil assembly;

FIG. 6 is a fragmentary side elevational view of a portion of the sandwiching machine, illustrating the mechanism for adjusting the valve in the stencil sleeve of the stencil assembly;

FIG. 7 is a side elevational view of the valve of the present invention; and

FIG. 8 is a perspective view of the valve of FIG. 7.

DETAILED DESCRIPTION OF THE PRESENT INVENTION

Figure 1:
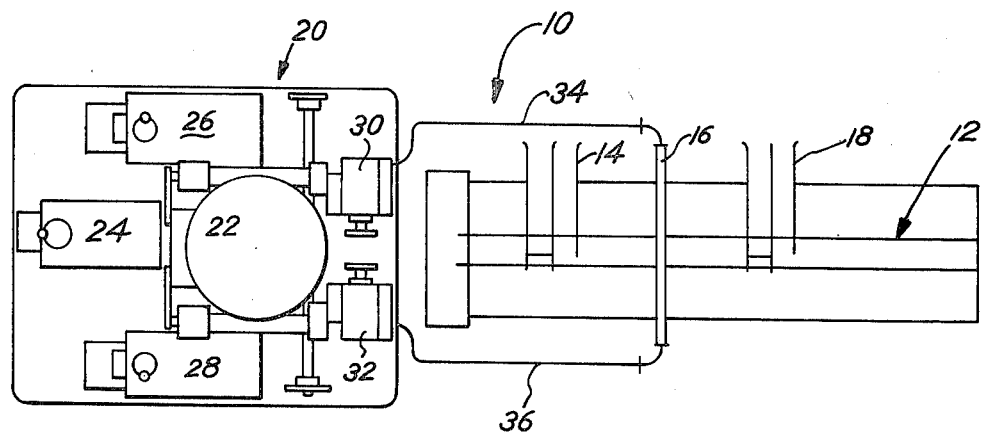
FIG. 1 is a schematic illustration of a sandwiching machine embodying the present invention and including a single creme hopper, with two pumps, for feeding creme to each side of a stencil assembly.

Referring to FIG. 1, there is illustrated schematically a presently preferred embodiment of the present invention. The sandwiching machine 10 includes a cookie feed and conveying apparatus 12 having rows of cookies carried in side-by-side relationship along taut wires by conveyors traveling at the same rates of speed. The first hopper 14 deposits cookies on the conveyors. The stencil means or stencil assembly 16 applies a creme or filling to the top of the cookie and then a second cookie from hopper 18 is placed on top of the creme on the first cookie to complete the formation of the sandwich.

Hopper means 20 are associated with or connected with the cookie feed and conveyor apparatus 12. As shown, the hopper means 20 includes a hopper 22 having an auger and stirrer motor 24 for rotating a stirrer within the hopper 22 to feed the auger, which in turn feeds the creme to the pumps 30 and 32 and separate motor means 26 and 28 for actuating the pumps 30 and 32, respectively to pump the creme or filling through the conduits 34 and 36 respectively to each side of the stencil means or stencil assembly 16. The motor means 26 and 28 are preferably Reeves variable speed motor drives. The creme may be any type of flavoring used in conventional cookie sandwiches, including vanilla filling, chocolate filling, peanut butter filling, jelly filling or the like. As shown in FIG. 1, the same creme will be supplied from hopper 22 through the conduits 34 and 36 to each side of the stencil means 16.

Figure 2:
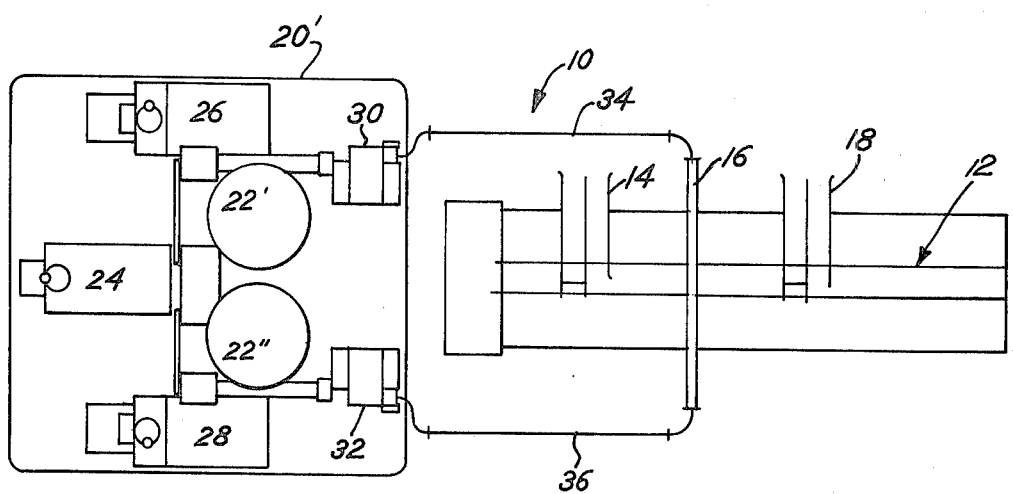
FIG. 2 is a schematic illustration of a sandwiching machine similar to FIG. 1, but showing a dual creme hopper with two pumps for feeding the same or different cremes to each side of a stencil assembly.

The arrangements of FIG. 2 incorporates two separate hoppers 22' and 22" in the hopper means 20'. By this arrangement separate cremes can be supplied to each side of the stencil means 16, such that a different filling may be applied to each of the two rows of cookies in the cookie feed and conveying apparatus 12 of sandwiching machine 10. It will be understood that the hoppers 22' and 22" may be separate units or they may be separate compartments in a single unitary housing.

Turning to FIG. 3, there is illustrated the stencil assembly 16. The stencil assembly 16 includes a stencil sleeve 38 and a stencil 39 journaled or rotatably supported thereon. The stencil assembly 16 extends transversely of the sandwiching machine 10 and the stencil sleeve 38 thereof is secured by quick release clamps 40 and 42, such as shown, for example, in Talbot U.S. Pat. No. 3,340,824 and Rose U.S. Pat. No. 4,162,882. Stencil adaptor 44 is joined to one end of stencil sleeve 38 by clamp means 45. The clamp means 45 are of the quick release type to permit cleaning of the stencil adaptor 44, which provides one inlet to the stencil 38, or to permit replacement of the O-ring seal 46. The adaptor or inlet 44 is adapted to be connected to the conduit 34 from the hopper means 20.

A stencil adaptor 48 is joined to the end of the stencil sleeve 38 opposite adaptor 44. The adaptor 48 includes an angle portion or inlet 49 which is adapted to be connected to conduit 36 from hopper means 20, and a tubular longitudinally disposed body 50 which is connected at one end with stencil sleeve 38.

The stencil 39 comprises a stencil drive sleeve 52 journaled on the stencil sleeve 38 by spaced apart bearings 54, 55, a central cylindrical body 56 within which the discharge openings or orifices 58 are formed, and a sleeve 60 journaled on stencil sleeve 38 by spaced apart bearing 62, 63. Sleeve 60 abuts thrust washer 65 which in turn abuts collar 64 that is secured to the stencil sleeve 38. A sprocket 53 is welded or otherwise fixally secured to the outer periphery of the stencil drive sleeve 52 for driving the stencil 39.

Valve means 68 are provided within the stencil sleeve 38 for controlling the flow of creme through the discharge orifices 58 from the opposed inlets 44, 49 to the stencil means 16. The valve means 68 (see FIGS. 3, 4, 5, 7 and 8) includes a valve body 70 having lands 72, 74 thereon, with O-rings 76, 73 in recesses in the lands 72, 74 for sealing between the exterior of the valve body 70 and the interior of the stencil sleeve 38. The seal means comprised of the O-rings 76, 78 on the valve body 70 prevents intermixing of the creme entering the inlet 44, 49 to the stencil sleeve 38. Extending outwardly from the valve body 70 are identical valve segmetns 80. The valve segments 80 are formed as segments of a circle, with each having an arc that conforms to the internal configuration of the stencil sleeve 38. The segments 80 each have a flat top portion and leveled sides. Segments 80 are elongated longitudinally and are adapted to open and close ports 82 in the stencil sleeve 38 to control the flow of creme to the discharge openings 58 in stencil 39.

Actuating shaft 86 is pinned or otherwise connected to the valve body 70 for rotating same. The valve body 70 and segments 80 integrally formed therewith open and close the creme flow path through the stencil assembly 16, as will be more fully described below.

The outboard end of actuating shaft 86 is journaled by a bearing 88 carried in shut off plug 90 closing adaptor 48. The shut off plug 90 is retained in position by a suitable clamp 92. Actuating link 94 is secured at one end to actuate shaft 86 and at the other end to the rod 96 of cylinder 98. Cylinder 98 is secured to the frame of sandwiching machine 10. Actuation of the piston (not shown) in cylinder 98 will move rod 96 and actuating link 94 so as to rotate shaft 86 and the valve body 70 secured thereto to open and close the ports 82.

FIG. 4 shows the valve segment 80 in closed position over the associated port 82. The flow of creme from the interior of stencil sleeve 38 to discharge orifice 58 in stencil 39 is blocked. In FIG. 5, the valve segment 80 has been moved to the open position. Creme can flow through port 82 to the discharge orifice 58 for discharge onto a cookie C. In FIG. 5 there is shown a portion of the cut-off mechanism 102 for cutting the creme from the stencil 39. Reference may be made to Talbot U.S. Pat. No. 3,340,824 for more details of the cut off mechanism 102, which forms no part of the present invention.

In FIGS. 7 and 8, there is better shown the valve means 68, which are operated by cylinder 98 (FIGS. 3 and 6) to simultaneously open and close the ports 82 in stencil sleeve 38. The exterior contour of the segment 80 is complementary to the interior surface of the stencil sleeve 38. Each segment 80 is elongated beyond the maximum longitudinal dimension of each port 82 to assure complete cover and closure of each port 82 when the valve means 68 are moved to the closed position.

The operation of the sandwiching machine of the present invention, which incorporates a dual feed stencil assembly will be summarized. Creme is fed under pressure of pump means from a hopper to each end of a stencil assembly 16 that is disposed transversely of rows of cookies moved in side-by-side relationship. The stencil assembly 16 includes a fixed stencil sleeve 38 and a stencil 39 rotatably supported on the stencil sleeve 38. The stencil sleeve 38 has at least a pair of spaced apart ports 82 and the stencil has a pair of aligned discharge orifices 58. The spacing of the ports 82 and the aligned orifices 58 corresponds to the spacing of the rows of cookies. Valve means 68 are provided in the stencil sleeve to control the flow of creme from each inlet to the stencil sleeve to one of the discharge orifices. Uniformity of flow to each port is secured. Further, by virtue of the ability to use separate compartments or separate hoppers to feed creme to each end of the stencil assembly, it is possible to feed the same or a different filling creme to each discharge orifice of the stencil assembly. Though the invention is disclosed as applied to a two row sandwiching machine, it could also be applied to a four row sandwiching machine in which case, for example, four pumps would feed four stencil inlets, i.e. two stencils each having inlets at each end.

While we have shown presently preferred embodiments of the present invention, we do not wish to limit ourselves to such embodiments but to cover in the following claims all modified structures or equivalents which are embodied within the spirit and scope of the present invention and the following claims.

We claim:

1. In a sandwiching machine for use in applying creme to at least two laterally spaced rows of cookies traveling along said sandwiching machine, said sandwiching machine including stencil means for applying creme to the cookies in a uniform manner, said stencil means comprising a stencil sleeve and a stencil rotatable thereon, said stencil having spaced apart discharge orifices and said stencil sleeve having inlets at each side of the discharge orifices, said stencil sleeve having at least two longitudinally spaced ports aligned with the discharge orifices in said stencil, valve means within the stencil sleeve for controlling the flow of creme through the discharge orifices, said valve means comprising a generally cylindrical valve body having segments extending generally axially therefrom and cooperating with the longitudinally spaced ports to control the flow of creme, the construction precluding mixing of creme supplied to the separate stencil sleeve inlets, and creme hopper means communicating with the stencil means for supplying creme to each of the stencil sleeve inlets.

2. A sandwiching machine as in claim 1 wherein the creme hopper means comprises a unitary hopper for supplying one creme to each inlet of the stencil sleeve.

3. A sandwiching machine as in claim 1 wherein the creme hopper means comprises a hopper having at least two compartments, with creme from a first compartment being supplied to one inlet of the stencil sleeve, and creme from a second compartment being supplied to the other inlet of the stencil sleeve.

4. A sandwiching machine as in claim 1 wherein the creme hopper means comprises at least two hoppers, each containing a different creme, one hopper being communicated with one inlet of the stencil sleeve, and the other hopper being communicated with the other inlet of the stencil sleeve.

5. A sandwiching machine as in claims 2, 3 or 4 wherein the creme hopper means includes pump means for moving the creme from the hopper means to the stencil sleeve inlets.

6. A sandwiching machine as in claim 1 wherein the valve means includes a shaft that is rotated to selectively move the segments to open and close the longitudinal spaced ports so as to control the flow of creme from the stencil means.

7. A sandwiching machine as in claim 1 wherein the valve means is provided with seal means between the valve means and the stencil sleeve to preclude mixing of creme supplied to the separate stencil sleeve inlets.

8. A sandwiching machine as in claim 1 including pump means between the cream hopper means and each inlet of the stencil sleeve for moving creme to each stencil sleeve inlet.

9. A sandwiching machine as in claim 8 including an auger means for feeding creme to the pump means from the creme hopper means.

10. A sandwiching machine as in claim 4 including auger means associated with each hopper.

11. A sandwiching machine as in claim 10 including pump means between each auger means and a stencil sleeve inlet for moving creme to the associated stencil sleeve inlet.

* * * * *